(12) United States Patent
Amamoto et al.

(10) Patent No.: US 9,925,831 B2
(45) Date of Patent: *Mar. 27, 2018

(54) MULTILAYER STRUCTURE, INNER LINER FOR PNEUMATIC TIRE, AND PNEUMATIC TIRE

(75) Inventors: Tetsuo Amamoto, Kodaira (JP); Nahoto Hayashi, Kurashiki (JP); Masao Hikasa, Kibi chuo-cho (JP); Yusuke Tanaka, Kamisu (JP)

(73) Assignees: BRIDGESTONE CORPORATION, Chuo-Ku, Tokyo (JP); Kuraray Co., Ltd., Kurashiki-shi, Okayama (JP)

( * ) Notice: Subject to any disclaimer, the term of this patent is extended or adjusted under 35 U.S.C. 154(b) by 386 days.

This patent is subject to a terminal disclaimer.

(21) Appl. No.: 14/119,938

(22) PCT Filed: May 29, 2012

(86) PCT No.: PCT/JP2012/003510
§ 371 (c)(1),
(2), (4) Date: Nov. 25, 2013

(87) PCT Pub. No.: WO2012/164917
PCT Pub. Date: Dec. 6, 2012

(65) Prior Publication Data
US 2014/0076474 A1    Mar. 20, 2014

(30) Foreign Application Priority Data
May 31, 2011    (JP) .................... 2011-122828

(51) Int. Cl.
*B60C 1/00*    (2006.01)
*B60C 5/14*    (2006.01)
(Continued)

(52) U.S. Cl.
CPC .......... *B60C 1/0008* (2013.01); *B32B 25/08* (2013.01); *B32B 25/14* (2013.01); *B32B 27/16* (2013.01);
(Continued)

(58) Field of Classification Search
CPC ....... B32B 27/08; B32B 27/306; B32B 27/40; B60C 1/0008; B60C 5/14; B60C 2005/145
See application file for complete search history.

(56) References Cited

U.S. PATENT DOCUMENTS 5,040,583 A    8/1991    Lin et al.
6,082,025 A *  7/2000    Bonk .................. A43B 1/0045
                                                           36/28
(Continued)

FOREIGN PATENT DOCUMENTS

CN    102046724 A    5/2011
EP    2 267 073 A1   12/2010
(Continued)

OTHER PUBLICATIONS

International Search Report for PCT/JP2012/003510 dated Jul. 24, 2012.
(Continued)

*Primary Examiner* — Monique Jackson
(74) *Attorney, Agent, or Firm* — Sughrue Mion, PLLC

(57) ABSTRACT

To provide a multilayer structure having high gas bather property and crack resistance as well as excellent fatigue resistance, an inner liner for a pneumatic tire using the multilayer structure, and a pneumatic tire comprising the inner liner. According to the present invention, the multilayer structure includes a barrier layer 2 made of polymer material with 50% or less elongation at break conforming to JIS K 7113 at 20° C. and 65% RH and an elastomer layer 3
(Continued)

made of polymer material with 100% or more elongation at break conforming to JIS K 7113 at 20° C. and 65% RH, wherein a plastic deformation amount at the time of 100% strain input is larger than a deformation amount at a tolerance point.

5 Claims, 3 Drawing Sheets

(51) Int. Cl.
*B32B 25/08* (2006.01)
*B32B 27/30* (2006.01)
*B32B 27/16* (2006.01)
*B32B 27/40* (2006.01)
*B32B 25/14* (2006.01)
*B32B 1/00* (2006.01)

(52) U.S. Cl.
CPC ............ *B32B 27/306* (2013.01); *B32B 27/40* (2013.01); *B60C 5/14* (2013.01); *B32B 1/00* (2013.01); *B32B 2250/05* (2013.01); *B32B 2250/24* (2013.01); *B32B 2250/42* (2013.01); *B32B 2274/00* (2013.01); *B32B 2307/50* (2013.01); *B32B 2307/51* (2013.01); *B32B 2307/7244* (2013.01); *B32B 2605/00* (2013.01); *B60C 2005/145* (2013.01); *Y10T 428/269* (2015.01); *Y10T 428/31504* (2015.04); *Y10T 428/31551* (2015.04); *Y10T 428/31725* (2015.04); *Y10T 428/31786* (2015.04); *Y10T 428/31855* (2015.04)

(56) References Cited

U.S. PATENT DOCUMENTS

| 2010/0186866 A1 | 7/2010 | Tomoi |
| 2011/0024015 A1 | 2/2011 | Takahashi et al. |

FOREIGN PATENT DOCUMENTS

| JP | 1-314164 A | 12/1989 |
| JP | 6-40207 A | 2/1994 |
| JP | 2009-263653 A | 11/2009 |
| WO | 2008/029939 A1 | 3/2008 |

OTHER PUBLICATIONS

Communication from the Chinese Patent Office dated Dec. 25, 2014 in a counterpart Chinese Application No. 201280037971.2.
Communication from the European Patent Office dated Feb. 9, 2015 in a counterpart European Application No. 12793428.9.
Communication from the Chinese Patent Office dated Aug. 10, 2015 in a counterpart Chinese Application No. 201280037971.2.
Communication dated Oct. 6, 2015 from the Japanese Patent Office in counterpart application No. 2013-517877.
Kuraray Co., Ltd. Product Brochure for Thermoplastic Polyurethane Elastomer: Tradename: Kuramiron, 2010.

\* cited by examiner (a)

(b)

(c)

(d)

MULTILAYER STRUCTURE, INNER LINER FOR PNEUMATIC TIRE, AND PNEUMATIC TIRE

CROSS REFERENCE TO RELATED APPLICATIONS

This application is a National Stage of International Application No. PCT/JP2012/003510 filed May 29, 2012, claiming priority based on Japanese Patent Application No. 2011-122828 filed May 31, 2011, the contents of all of which are incorporated herein by reference in their entirety.

TECHNICAL FIELD

The present invention relates to a multilayer structure including a barrier layer and an elastomer layer, and more specifically, to a multilayer structure having high gas bather property and crack resistance as well as excellent fatigue resistance, an inner liner for a pneumatic tire using the multilayer structure, and a pneumatic tire comprising the inner liner.

BACKGROUND ART

Conventionally, for the inner liner disposed as an air barrier layer on an inner surface of a tire for maintaining internal pressure of the tire, a rubber composition mainly made of butyl rubber or halogenated butyl rubber have been used. However, since the rubber composition mainly made of the butyl rubber has a low air barrier property, when the rubber composition is used for the inner liner, the inner liner needs to have a thickness of around 1 mm.

On the other hand, ethylene-vinyl alcohol copolymer (hereinafter, it may be abbreviated as EVOH) is known to have an excellent gas barrier property. Since an oxygen permeability amount of the EVOH is hundredth part or less of that of the rubber composition used for the butyl-based inner liner described above, an inner liner made of EVOH with a thickness of 100 μm or less may significantly improve internal pressure retention of the tire. The inner liner made of EVOH with the thickness of 100 μm or less is usable and therefore hardly breaks or causes cracks due to bending deformation at the time of tire rolling. Hence, it may be said that, in order to improve the internal pressure retention of a pneumatic tire, it is effective to use EVOH for the inner liner of the tire. Patent Document 1, for example, discloses a pneumatic tire comprising an inner liner made of EVOH.

However, when normal EVOH is used for the inner liner, while it is very effective in improving the internal pressure retention of the tire, the inner liner made of EVOH has been broken or causing cracks due to deformation during bending due to its elastic modulus significantly higher than that of rubber commonly used for the tire. Therefore, when the inner liner made of EVOH is used, although the internal pressure retention of the tire before use of the tire is greatly improved, a used tire subjected to bending deformation during tire rolling sometimes has the internal pressure retention lower than that before use.

Accordingly, development of an inner liner that has high crack resistance while maintaining the gas barrier property and thus allows a reduction in thickness has been desired. To that end, it is considered to use a laminated product in which an elastic film or a sheet with an excellent crack resistance and a resin film with excellent gas barrier property are joined and integrated. In such a case, since the elastic film or the like is included in the laminated product, it becomes a question whether an excellent gas barrier property may be achieved. Further, when the laminated product is used as the inner liner, improvement in fatigue resistance to be durable for a prolonged use has been desired.

RELATED ART DOCUMENT

Patent Document

Patent Document 1: Japanese Patent Laid-Open No. 6-40207

SUMMARY OF INVENTION

Technical Problem

As such, an object of the present invention is, by solving the above problem of conventional techniques, to provide a multilayer structure having high gas barrier property and crack resistance as well as excellent fatigue resistance. Also, another object of the present invention is to provide an inner liner for a pneumatic tire using such a multilayer structure and a pneumatic tire comprising the inner liner.

Solution to Problem

As a result of intensive studies of a multilayer structure comprising a barrier layer and an elastomer layer in order to achieve the above objects, the present inventors have found that, by making the barrier layer with polymer material having 50% or less elongation at break at 20° C. and making the elastomer layer with polymer material having 100% or more elongation at break such that a plastic deformation amount of the multilayer structure at the time of 100% strain input is greater than a deformation amount at a pseudo tolerance point, stress applied to the multilayer structure may be efficiently dispersed, thereby ensuring high gas barrier property and crack resistance and achieving excellent fatigue resistance. The present inventors have thus accomplished the present invention.

According to the present invention, that is, the multilayer structure has the bather layer made of polymer material with 50% or less elongation at break conforming to JIS K 7113 at 20° C. and 65% RH and the elastomer layer made of polymer material with 100% or more elongation at break conforming to JIS K 7113 at 20° C. and 65% RH, where a difference between an input deformation amount of the multilayer structure at the time of 100% deformation input and a plastic deformation amount of the multilayer structure at the time of 100% deformation input is larger than a deformation amount at a tolerance point.

Preferably, the multilayer structure is made by alternately laminating the barrier layers and the elastomer layers to form seven or more layers, and the elastomer layer and has 100% or more elongation at break.

Preferably, the barrier layer has an oxygen permeability amount of 10.0 cc·mm/m²·day·atm or less at 20° C. and 65% RH and a thickness of 10 μm or less.

Preferably, the polymer composing the barrier layer includes resins of one or more types having a polar group of OH, S, Cl or F, where the resin having the polar group is at least one selected from ethylene-vinyl alcohol copolymer or modified ethylene-vinyl alcohol copolymer, polyvinyl alcohol, nylon, vinyl chloride and ionomer.

Preferably, the polymer material composing the elastomer layer includes at least one selected from polystyrene-based thermoplastic elastomer, polyolefin-based thermoplastic elastomer, polydiene-based thermoplastic elastomer, polyvinyl chloride-based thermoplastic elastomer, chlorinated polyethylene-based thermoplastic elastomer, polyurethane-based thermoplastic elastomer, polyester-based thermoplastic elastomer, polyamide-based thermoplastic elastomer and fluorine resin-based thermoplastic elastomer.

Further, an inner liner for a pneumatic tire according to the present invention is characterized in using the multilayer structure described above, and a pneumatic tire according to the present invention is characterized in including the inner liner.

Effect of the Invention

According to the present invention, a multilayer structure having high gas bather property and crack resistance as well as excellent fatigue resistance may be provided. Also, an inner liner for a pneumatic tire using such a multilayer structure and a pneumatic tire having the inner liner may be provided.

DESCRIPTION OF EMBODIMENT

<Multilayer Structure>

Figure 1:
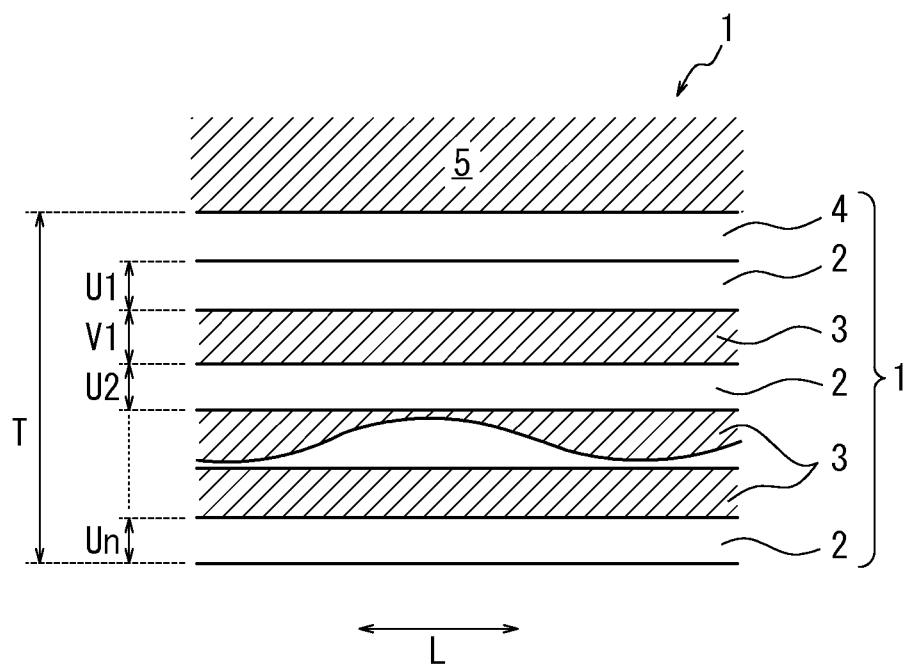
FIG. 1 is a cross-sectional view of an example of a multilayer structure according to the present invention.

An embodiment of the present invention will be described in detail with reference to the accompanying drawings. FIG. 1 is a cross-sectional view of an example of a multilayer structure according to the present invention.

A multilayer structure 1, as illustrated in FIG. 1, includes a bather layer 2 made of polymer material with 50% or less elongation at break at 20° C. and an elastomer layer 3 made of polymer material with 100% or less deformation amount at a tolerance point.

The multilayer structure 1 according to the present invention has a difference between an input deformation amount at the time of 100% deformation input and a plastic deformation amount at the time of 100% deformation input larger than a deformation amount at the tolerance point.

Here, the plastic deformation amount of the multilayer structure at the time of 100% deformation input means a plastic deformation amount when, as illustrated in FIG. 1, the multilayer structure 1 is elongated by 100% along a direction L perpendicular to a laminating direction of the multilayer structure 1. The tolerance point is a term expedientially defining a boundary between the elastic deformation and the plastic deformation as a stress corresponding to a yield stress, on ground that the polymer material composing the elastomer layer may, without showing no yield phenomenon to metal such as steel which shows yield, show a relationship between the stress and the deformation amount as illustrated in FIG. 3(a). The tolerance point is defined as a stress at an intersection of an extrapolation straight line K and a stress X at the time of 100% deformation input, and a strain at that time is defined as a pseudo tolerance strain.

According to the present invention, as illustrated in FIG. 3(a), for example, by setting a difference (B–C) between the input deformation amount (B) at the time of 100% deformation input and the plastic deformation amount (C) to be larger than the deformation amount (A) at the tolerance point ((B–C)>A), some elastic deformation may be made as well as the plastic deformation after exceedance of the tolerance point. As a result, flexibility of the entire layered structure may be ensured and, even when the multilayer structure is used for an inner liner or the like and deformed as deformation of rubber, followability to the deformation is substantialized and excellent fatigue resistance may be obtained.

Note that the pseudo tolerance point of the multilayer structure according to the present invention may be obtained from, as illustrated in FIG. 3(a), the stress at the intersection of the extrapolation straight line K and the stress X at the time of 100% deformation input. The extrapolation straight line K is a straight line that is, in a curved line showing a relationship between tensile stress and the deformation amount illustrated in FIG. 3(a), extended from a straight-line portion connecting a point of 7% stress and a point of 12% stress.

By using the extrapolation straight line K, as illustrated in FIGS. 3(a)-(d), with regard to a relationship between the stress and the deformation amount in various patterns, parameters necessary for the present invention ((A) the deformation amount at the tolerance point, (B) the input deformation amount at the time of 100% deformation input, and (C) the plastic deformation amount at the time of 100% deformation input) may be obtained.

Further, since the multilayer structure according to the present invention includes the barrier layer having a high gas barrier property and the elastomer layer having high toughness, excellent gas barrier property of the multilayer structure may be ensured and, and high crack resistance may be provided by a function of the toughness of the elastomer layer.

The elongation at break of the multilayer structure according to the present invention is preferably 100% or more. This is because, when the elongation at break is less than 100%, the multilayer structure has insufficient flexibility and is unable to follow the deformation, thus possibly deteriorating the fatigue resistance. Here, elongation at break (EB) represents elongation at break when, conforming to JIS K 7113 under conditions of 20° C. and 65% RH, a sample with a thickness of 1 mm is measured at a tensile rate of 500 mm/min by using a dumbbell of JIS No. 3.

Preferably, the barrier layers 2 and the elastomer layers 3 are alternately laminated, thereby seven or more layers consisting of the bather layers 2 and the elastomer layers 3 are formed as illustrated in FIG. 1. This is because alternate lamination of the barrier layer 2 and the elastomer layer 3 enables obtainment of better crack resistance.

The total number of layers of the bather layer 2 having a bather property may be, but not particularly limited to, preferably 11 or more, more preferably 15 or more, in terms of achieving a higher gas barrier property. Note that an upper limit of the total number of layers of the bather layer 2 having the barrier property may be, but not particularly limited to, preferably 3000 or less, in terms of reducing a weight of the multilayer structure 1.

According to the multilayer structure of the present invention, as illustrated in FIG. 1, each of thicknesses U1, U2, U3 . . . and Un of the elastomer layer 3 and each of thicknesses V1, V2, V3 . . . and Vn of the barrier layer 2 is preferably within a range of 0.001-40 μm. When each of the thickness U and the thickness V is within the above range, the crack resistance may be improved by enhancing the toughness and the number of layers forming the multilayer structure may be increased. Therefore, comparing to a multilayer structure with the same thickness but formed of less number of layers, the gas bather property and the crack resistance of the multilayer structure may be improved.

Also, in terms of achieving higher crack resistance, it is preferable to further reduce the thickness V of the barrier layer 2, more preferably 10 μm or less.

For example, although polystyrene may be mentioned as an example of the polymer material for forming a conventional barrier layer, polystyrene is known as a brittle material and a layer made of polystyrene may be broken at about 1.5% elongation at room temperature. However, in "Polymer, 1993, vol. 34 (10), 2148-2154", it is reported that, by laminating a layer made of ductile material and a layer made of polystyrene and limiting a thickness of the layer made of polystyrene to 1 μm or less, the brittleness of the layer made of polystyrene is reformed to become ductile. That is, it is considered that a layer made of a brittle material such as polystyrene may be reformed to have toughness when the thickness thereof is significantly reduced. The present inventors, by focusing on such a concept, have found a multilayer structure that may achieve both excellent gas barrier property and crack resistance.

As illustrated in FIG. 1, also, a thickness T of the whole multilayer structure 1 according to the present invention is preferably in a range of 0.1-1000 μm, more preferably in a range of 0.5-750 μm, particularly preferably in a range of 1-500 μm. The multilayer structure having a thickness within the ranges described above may be suitably used as an inner liner for a pneumatic tire and, in combination with limitation of an average thickness of each of the barrier layer and the elastomer layer, may have further improved gas barrier property and crack resistance.

Further, the bather layer and the elastomer layer forming the multilayer structure of the present invention are preferably crosslinked by irradiation of active energy rays. By crosslinking the multilayer structure 1 by irradiation of the active energy rays, affinity between the laminated layers 2 and 3 is improved and high adhesion may be expressed. As a result, interlayer adhesion of the multilayer structure, and therefore the gas barrier property and the crack resistance of the multilayer structure may be significantly improved. Note that the active energy rays represent electromagnetic waves or charged particle beams having energy quantum and, as specific examples, ultraviolet, γ rays, electron beams and the like may be mentioned. Among them, the electron beam is preferable in terms of an effect of improving the interlayer adhesion. When irradiating the electron beams as the active energy rays, various electron beam accelerators of such as, for example, Cockroft-Walton type, Van de Graft type, a resonance transformer type, an insulated core transformer type, a linear type, Dynamitron type, a high frequency type and the like may be used as an electron beam source. An acceleration voltage is usually 100-500 kV, and irradiation dose is usually in a range of 5-600 kGy. In irradiating ultraviolet as the active energy rays, ultraviolet including wavelength of 190-380 nm is preferably used. The ultraviolet source may be, but not particularly limited to, for example, a high-pressure mercury lamp, a low pressure mercury lamp, a metal halide lamp, a carbon arc lamp or the like.

(Barrier Layer)

The bather layer forming the multilayer structure according to the present invention, in order to substantialize an air barrier property of the multilayer structure to maintain an internal pressure of the tire, contains a polymer material having the gas bather property.

Also, elongation at break of the polymer material alone forming the barrier layer at 20° C. is 50% or less. This is because, when the elongation at break exceeds 50%, there is a risk of lowering crystallinity and reducing the bather property. Here, the elongation at break (EB) represents the elongation at break when, conforming to JIS K 7113 under the conditions of 20° C. and 65% RH, a sample with a thickness of 1 mm is measured at the tensile rate of 500 mm/min by using the dumbbell of JIS No. 3.

Oxygen permeability of the bather layer at 20° C. and 65% RH, in terms of ensuring high air barrier property of the multilayer structure, is preferably 10.0 cc·mm/m$^2$·day·atm or less, more preferably 5.0 cc·mm/m$^2$·day·atm or less, particularly preferably 1.0 cc·mm/m$^2$·day·atm or less. If the oxygen permeability at 20° C. and 65% RH exceeds 10.0 cc·mm/m$^2$·day·atm, it becomes necessary to thicken the barrier layer to enhance the inner pressure retention of the tire, hindering sufficient weight reduction of the inner liner.

Also, the polymer material forming the barrier layer is not particularly limited, as long as capable of ensuring a desired air bather property. As the polymer material, for example, polyamide resin, ethylene-vinyl alcohol copolymer, modified ethylene-vinyl alcohol copolymer, urethane polymer, olefin polymer, diene polymer and the like may be mentioned. Those resins may be used alone, or in combination with one or more other resins.

Further, the polymer material forming the barrier layer is preferably at least one kind of a resin having a polar group of OH, S, Cl or F. This is because, when the polymer material contains a resin having these polar groups, cohesive energy density is increased and, as a result, the gas bather property may be further improved.

Further, the resin having the polar group is preferably at least one selected from ethylene-vinyl alcohol copolymer, modified ethylene-vinyl alcohol copolymer, polyvinyl alcohol, nylon, polyvinyl chloride, and ionomer. This is because these resins have a low oxygen permeability amount and excellent gas barrier property.

The ethylene-vinyl alcohol copolymer (EVOH) has ethylene content at preferably 0 to 50 mol %, more preferably 25 to 50 mol %, particularly preferably 25 to 45 mol %. When the ethylene content is less than 25 mol %, the crack resistance, the fatigue resistance and melt-moldability may be deteriorated and, when the ethylene content exceeds 50 mol %, sufficient gas barrier property may not be ensured. Also, the ethylene-vinyl alcohol copolymer preferably has saponification degree at 90% or more, more preferably 95% or more, particularly preferably 99% or more. When the saponification degree is under 90%, the gas barrier property and thermal stability during molding may be insufficient. Further, the ethylene-vinyl alcohol copolymer has a melt flow rate (MFR) at, at 190° C. under a load of 2160 g, preferably 0.1-30 g/10 minutes, more preferably 0.3-25 g/10 minutes. When the MFR is less than 0.1 g/10 min, extrusion may become difficult due to high viscosity and, when the MFR is more than 30 g/10 min, the viscosity is so low that shape stability at the time of extrusion molding may be impaired.

In the ethylene-vinyl alcohol copolymer, 1,2-glycol bond structural unit content G (mol %) preferably satisfies the following formula:

$$G \leq 1.58 - 0.0244 \times E$$

[in the formula, G represents the 1,2-glycol bond structural unit content (mol %), and E represents ethylene unit content (mol %) in the EVOH, where E≤64 is satisfied] and, simultaneously, intrinsic viscosity is preferably in a range of 0.05-0.2 L/g. By using such EVOH, a resulting inner liner has less humidity dependency of the gas bather property and has excellent transparency and gloss, thereby facilitating lamination to a layer made of a different resin. Note that the 1,2-glycol bond structural unit content may be measured by, in accordance with a method described in "S. Aniya et al, Analytical Science Vol. 1, 91 (1985)", a nuclear magnetic resonance method at 90° C. having dimethyl sulfoxide solution as an EVOH sample.

The modified ethylene-vinyl alcohol copolymer is a polymer containing, in addition to ethylene unit and vinyl alcohol unit, one or more repeating units (hereinafter, also referred to as a structural unit) such as, for example, repeat units induced from these units. Note that, for the modified EVOH, suitable ethylene content, saponification degree, melt flow rate (MFR), 1,2-glycol bond structural unit content and intrinsic viscosity are similar to those of EVOH described above.

The modified EVOH preferably has at least one structural unit selected from, for example, a structural unit (I) and a structural unit (II) shown below, and more preferably contains the structural unit at a ratio of 0.5 to 30 mol % of a total structural units. Such a modified EVOH may improve flexibility and moldability of a resin or a resin composition, the interlayer adhesion, stretchability and thermoformability of the inner liner.

[Chemical formula 1]

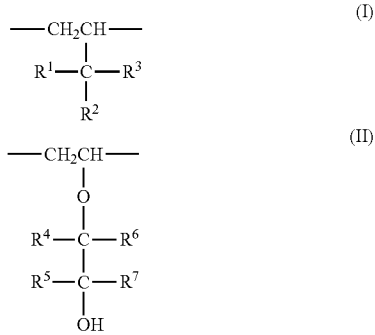

Each of $R^1$, $R^2$ and $R^3$ in the above formula (I) independently represents a hydrogen atom, an aliphatic hydrocarbon group having 1 to 10 carbon atoms, an alicyclic hydrocarbon group having 3 to 10 carbon atoms, an aromatic hydrocarbon group having 6 to 10 carbon atoms, or a hydroxy group. Also, one pair of $R^1$, $R^2$ or $R^3$ may be joined together (excluding a pair of $R^1$, $R^2$ or $R^3$ in which both of them are hydrogen atoms). Further, the aliphatic hydrocarbon group having 1 to 10 carbon atoms, the alicyclic hydrocarbon group having 3 to 10 carbon atoms, or the aromatic hydrocarbon group having 6 to 10 carbon atoms may have the hydroxy group, a carboxy group or a halogen atom. On the other hand, each of R4, R5, R6 and R7 in the above formula (II) independently represents the hydrogen atom, the aliphatic hydrocarbon group having 1 to 10 carbon atoms, the alicyclic hydrocarbon group having 3 to 10 carbon atoms, the aromatic hydrocarbon group having 6 to 10 carbon atoms, or the hydroxy group. R4 and R5, or R6 and R7 may be joined together (excluding when both R4 and R5 or both R6 and R7 are hydrogen atoms). Also, the aliphatic hydrocarbon group having 1 to 10 carbon atoms, the alicyclic hydrocarbon group having 3 to 10 carbon atoms, or the aromatic hydrocarbon group having 6 to 10 carbon atoms may have the hydroxy group, an alkoxy group, the carboxy group or the halogen atom.

In the modified EVOH, a lowest limit of an amount of the structure unit (I) and/or (II) with respect to the total structural units is preferably 0.5 mol %, more preferably 1 mol %, particularly preferably 1.5 mol %. On the other hand, in the modified EVOH, the highest limit of the amount of the structure unit (I) and/or (II) with respect to the total structural units is preferably 30 mol %, more preferably 15 mol %, particularly preferably 10 mol %. When the specific amount of the structural unit (I) and/or (II) described above are contained, the flexibility and processing characteristics of the resin or the resin composition, as well as the interlayer adhesion of the inner liner, the stretchability and the thermoformability, may be improved.

For the structural units (I) and (II), as the aliphatic hydrocarbon group having 1 to 10 carbon atoms, an alkyl group, an alkenyl group and the like may be mentioned. As the alicyclic hydrocarbon group having 3 to 10 carbon atoms, a cycloalkyl group, a cycloalkenyl group and the like may be mentioned. As the aromatic hydrocarbon group having 6 to 10 carbon atoms, a phenyl group and the like may be mentioned.

In the structural unit (I), preferably, each of $R^1$, $R^2$ and $R^3$ independently represents a hydroxyethyl atom, a methyl group, an ethyl group, the hydroxy group, a hydroxymethyl group or a hydroxyethyl group. Among them, preferably, each of $R^1$, $R^2$ and $R^3$ independently represents the hydrogen atom, the methyl group, the hydroxy group or the hydroxymethyl group. Such $R^1$, $R^2$ and $R^3$ may further improve the stretchability and the thermoformability of the inner liner.

A method for incorporating the structural unit (I) in the EVOH may be, but not particularly limited to, for example, during copolymerization of ethylene and vinyl ester, a method of further copolymerizing a monomer induced by the structural unit (I). The monomer induced by the structural unit (I) may be, for example, alkenes such as propylene, butylene, pentene, hexene and the like; alkens having the ester group or the hydroxy group such as 3-hydroxy-1-propene, 3-acyloxy-1-propene, 3-acyloxy-1-butene, 4-acyloxy-1-butene, 3,4-diacyloxy-1-butene, 3-acyloxy-4-hydroxy-1-butene, 4-acyloxy-3-hydroxy-1-butene, 3-acyloxy-4-methyl-1-butene, 4-acyloxy-2-methyl-1-butene, 4-acyloxy-3-methyl-1-butene, 3,4-diacyloxy-2-methyl-1-butene, 4-hydroxy-1-pentene, 5-hydroxy-1-pentene, 4,5-dihydroxy-1-pentene, 4-acyloxy-1-pentene, 5-acyloxy-1-pentene, 4,5-diacyloxy-1-pentene, 4-hydroxy-3-methyl-1-pentene, 5-hydroxy-3-methyl-1-pentene, 4,5-dihydroxy-3-methyl-1-pentene, 5,6-dihydroxy-1-hexene, 4-hydroxy-1-hexene, 5-hydroxy-1-hexene, 6-hydroxy-1-hexene, 4-acyloxy-1-hexene, 5-acyloxy-1-hexene, 6-acyloxy-1-hexene, 5,6-diacyloxy-1-hexene and the like. Among them, in terms of copolymerization reactivity and the gas barrier property of the resulting inner liner, propylene, 3-acyloxy-1-propene, 3-acyloxy-1-butene, 4-acyloxy-1-butene, and 3,4-diacetoxy-1-butene are preferred. Specifically, propylene, 3-acetoxy-1-propene, 3-acetoxy-1-butene, 4-acetoxy-1-butene, 3,4-diacetoxy-1-butene are more preferable, and 3,4-diacetoxy-1-butene is particularly preferable. Note that, in using alkene having ester, during a saponification reaction, the monomer is induced by the structural unit (I).

In the structural unit (II) described above, both $R^5$ and $R^4$ are preferably hydrogen atoms. More preferably, both $R^5$ and $R^4$ are hydrogen atoms, and one of $R^6$ and $R^7$ is an aliphatic hydrocarbon group having 1 to 10 carbon atoms and the other is a hydrogen atom. The aliphatic hydrocarbon group in the structural unit (II) is preferably the alkenyl group or the alkyl group. Also, in terms of placing importance on the gas bather property of the inner liner, one of R6 and R7 is preferably the methyl group or the ethyl group and the other is the hydrogen atom. Further, it is also preferable that one of $R^6$ and $R^7$ is a substituent group represented by $(CH_2)_hOH$ (h is an integer of 1 to 8) and the other is the hydrogen atom. In the substituent group represented by $(CH_2)_hOH$, h is preferably an integer of 1 to 4, more preferably 1 or 2, particularly preferably 1.

A method for incorporating the structural unit (II) in the EVOH may be, but not particularly limited to, a method to react a monovalent epoxy compound to EVOH obtained by the saponification reaction. The monovalent epoxy compound may be preferably a compound represented by any of the following formulas (III) to (IX).

[Chemical formula 2]

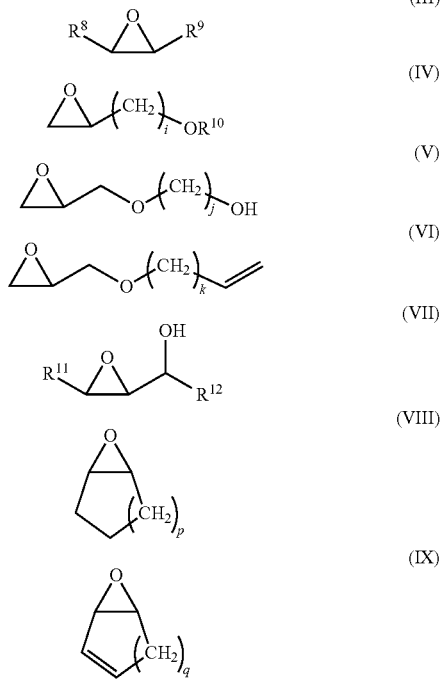

In the above formulas (III) to (IX), $R^8$, $R^9$, $R^{10}$, $R^{11}$ and $R^{12}$ represent the hydrogen atom, the aliphatic hydrocarbon group (the alkyl group or the alkenyl group) having 1 to 10 carbon atoms, the alicyclic hydrocarbon group (the cycloalkyl group or the cycloalkenyl group) having 3 to 10 carbon atoms, or the aromatic hydrocarbon group (the phenyl group and the like) having 6 to 10 carbon atoms. Note that $R^8$, $R^9$, $R^{10}$, $R^{11}$ and $R^{12}$ may be identical or different from each other. Also, i, j, k, p and q represent integers of 1-8.

The monovalent epoxy compound represented by the above formula (III) may be, for example, epoxyethane (ethylene oxide), epoxypropane, 1,2-epoxybutane, 2,3-epoxybutane, 3-methyl-1,2-epoxybutane, 1,2-epoxypentane, 2,3-epoxypentane, 3-methyl-1,2-epoxypentane, 4-methyl-1,2-epoxypentane, 4-methyl-2,3-epoxypentane, 3-ethyl-1,2-epoxypentane, 1,2-epoxyhexane, 2,3-epoxyhexane, 3,4-epoxyhexane, 3-methyl-1,2-epoxyhexane, 4-methyl-1,2-epoxyhexane, 5-methyl-1,2-epoxyhexane, 3-ethyl-1,2-epoxyhexane, 3-propyl-1,2-epoxyhexane, 4-ethyl-1,2-epoxyhexane, 5-methyl-1,2-epoxyhexane, 4-methyl-2,3-epoxyhexane, 4-ethyl-2,3-epoxyhexane, 2-methyl-3,4-epoxyhexane, 2,5-dimethyl-3,4-epoxyhexane, 3-methyl-1,2-epoxyheptane, 4-methyl-1,2-epoxyhexane, 5-methyl-1,2-epoxyheptane, 6-methyl-1,2-epoxyheptane, 3-ethyl-1,2-epoxyheptane, 3-propyl-1,2-epoxyheptane, 3-butyl-1,2-epoxyheptane, 4-ethyl-1,2-epoxyheptane, 4-propyl-1,2-epoxyheptane, 6-ethyl-1,2-epoxyheptane, 4-methyl-2,3-epoxyheptane, 4-ethyl-2,3-epoxyheptane, 4-propyl-2,3-epoxyheptane, 2-methyl-3,4-epoxyheptane, 5-methyl-3,4-epoxyheptane, 5-ethyl-3,4-epoxyheptane, 2,5-dimethyl-3,4-epoxyheptane, 2-methyl-5-ethyl-3,4-epoxyheptane, 1,2-epoxyheptane, 2,3-epoxyheptane, 3,4-epoxyheptane, 1,2-epoxyoctane, 2,3-epoxyoctane, 3,4-epoxyoctane, 4,5-epoxyoctane, 1,2-epoxynonane, 2,3-epoxynonane, 3,4-epoxynonane, 4,5-epoxynonane, 1,2-epoxydecane, 2,3-epoxydecane, 3,4-epoxydecane, 4,5-epoxydecane, 5,6-epoxydecane, 1,2-epoxyundecane, 2,3-epoxyundecane, 3,4-epoxyundecane, 4,5-epoxyundecane, 5,6-epoxyundecane, 1,2-epoxydodecane, 2,3-epoxydodecane, 3,4-epoxydodecane, 4,5-epoxydodecane, 5,6-epoxydodecane, 6,7-epoxydodecane, epoxyethylbenzene, 1-phenyl-1,2-propane, 3-phenyl-1,2-epoxypropane, 1-phenyl-1,2-epoxybutane, 3-phenyl-1,2-epoxypentane, 4-phenyl-1,2-epoxypentane, 5-phenyl-1,2-epoxypentane, 1-phenyl-1,2-epoxyhexane, 3-phenyl-1,2-epoxyhexane, 4-phenyl-1,2-epoxyhexane, 5-phenyl-1,2-epoxyhexane, 6-phenyl-1,2-epoxyhexane, or the like.

The monovalent epoxy compound represented by the above formula (IV) may be, for example, methyl glycidyl ether, ethyl glycidyl ether, n-propyl glycidyl ether, isopropyl glycidyl ether, n-butyl glycidyl ether, isobutyl glycidyl ether, tert-butyl glycidyl ether, 1,2-epoxy-3-pentyloxypropane, 1,2-epoxy-3-hexyloxypropane, 1,2-epoxy-3-heptyloxypropane, 1,2-epoxy-4-phenoxybutane, 1,2-epoxy-4-benzyloxybutane, 1,2-epoxy-5-methoxypentane, 1,2-epoxy-5-ethoxypentane, 1,2-epoxy-5-propoxypentane, 1,2-epoxy-5-butoxypentane, 1,2-epoxy-5-pentyloxypentane, 1,2-epoxy-5-hexyloxypentane, 1,2-epoxy-5-phenoxypentane, 1,2-epoxy-6-methoxyhexane, 1,2-epoxy-6-ethoxyhexane, 1,2-epoxy-6-propoxyhexane, 1,2-epoxy-6-butoxyhexane, 1,2-epoxy-6-heptyloxyhexane, 1,2-epoxy-7-methoxyheptane, 1,2-epoxy-7-ethoxyheptane, 1,2-epoxy-7-propoxyheptane, 1,2-epoxy-7-butoxyheputane, 1,2-epoxy-8-methoxyoctane, 1,2-epoxy-8-ethoxyoctane, 1,2-epoxy-8-butoxyoctane, glycidol, 3,4-epoxy-1-butanol, 4,5-epoxy-1-pentanol, 5,6-epoxy-1-hexanol, 6,7-epoxy-1-heptanol, 7,8-epoxy-1-octanol, 8,9-epoxy-1-nonanol, 9,10-epoxy-1-decanol, 10,11-epoxy-1-undecanol, or the like.

The monovalent epoxy compound represented by the above formula (V) may be, for example, ethylene glycol monoglycidyl ether, propanediol monoglycidyl ether, butanediol monoglycidyl ether, pentanediol monoglycidyl ether, hexanediol monoglycidyl ether, heptanediol monoglycidyl ether, octanediol monoglycidyl ether, or the like.

The monovalent epoxy compound represented by the above formula (VI) may be, for example, 3-(2,3-epoxy) propoxy-1-propene, 4-(2,3-epoxy)propoxy-1-butene, 5-(2, 3-epoxy)propoxy-1-pentene, 6-(2,3-epoxy)propoxy-1-hexene, 7-(2,3-epoxy)propoxy-1-heptene, 8-(2,3-epoxy) propoxy-1-octene, or the like.

The monovalent epoxy compound represented by the above formula (VII) may be, for example, 3,4-epoxy-2-butanol, 2,3-epoxy-1-butanol, 3,4-epoxy-2-pentanol, 2,3-epoxy-1-pentanol, 1,2-epoxy-3-pentanol, 2,3-epoxy-4-methyl-1-pentanol, 2,3-epoxy-4,4-dimethyl-1-pentanol, 2,3-epoxy-1-hexanol, 3,4-epoxy-2-hexanol, 4,5-epoxy-3-hexanol, 1,2-epoxy-3-hexanol, 2,3-epoxy-4,4-dimethyl-1-hexanol, 2,3-epoxy-4,4-diethyl-1-hexanol, 2,3-epoxy-4-methyl-4-ethyl-1-hexanol, 3,4-epoxy-5-methyl-2-hexanol, 3,4-epoxy-5,5-dimethyl-2-hexanol, 3,4-epoxy-2-heptanol, 2,3-epoxy-1-heptanol, 4,5-epoxy-3-heptanol, 2,3-epoxy-4-heptanol, 1,2-epoxy-3-heptanol, 2,3-epoxy-1-octanol, 3,4-epoxy-2-octanol, 4,5-epoxy-3-octanol, 5,6-epoxy-4-octanol, 2,3-epoxy-4-octanol, 1,2-epoxy-3-octanol, 2,3-epoxy-1-nonanol, 3,4-epoxy-2-nonanol, 4,5-epoxy-3-nonanol, 5,6-epoxy-4-nonanol, 3,4-epoxy-5-nonanol, 2,3-epoxy-4-nonanol, 1,2-epoxy-3-nonanol, 2,3-epoxy-1-decanol, 3,4-epoxy-2-decanol, 4,5-epoxy-3-decanol, 5,6-epoxy-4-decanol, 6,7-epoxy-5-decanol, 3,4-epoxy-5-decanol, 2,3-epoxy-4-decanol, 1,2-epoxy-3-decanol, or the like.

The monovalent epoxy compound represented by the above formula (VIII) may be, for example, 1,2-epoxycyclopentane, 1,2-epoxycyclohexane, 1,2-epoxycycloheptane, 1,2-epoxycyclooctane, 1,2-epoxycyclononane, 1,2-epoxycyclodecane, 1,2-epoxycycloundecane, 1,2-epoxycyclododecane, or the like.

The monovalent epoxy compound represented by the above formula (IX) may be, for example, 3,4-epoxycyclopentene, 3,4-epoxycyclohexene, 3,4-epoxycycloheptene, 3,4-epoxycyclooctene, 3,4-epoxycyclononene, 1,2-epoxycyclodecene, 1,2-epoxycycloundecene, 1,2-epoxycyclododecene, or the like.

Among the monovalent epoxy compounds set forth above, epoxy compounds having 2-8 carbon atoms are preferred. In particular, in terms of facilitating handling the compound and reactivity to EVOH, the number of carbon atoms of the monovalent epoxy compound is more preferably 2-6, particularly preferably 2-4. Also, the monovalent epoxy compound is particularly preferably a compound expressed by the formula (III) or the formula (IV) among compounds represented by above formulas. Specifically, in terms of reactivity to EVOH and the gas barrier property of the resulting inner liner, 1,2-epoxybutane, 2,3-epoxybutane, epoxypropane, epoxyethane and glycidol are preferable and, among them, epoxypropane and glycidol are particularly preferable.

According to the present invention, ethylene-vinyl alcohol copolymer may be obtained by polymerizing ethylene and vinylester to obtain ethylene-vinylester copolymer and saponifying the ethylene-vinylester copolymer. Further, modified ethylene-vinyl alcohol copolymer may be obtained by, as described above, (1) during polymerization of ethylene and vinylester, further copolymerizing a monomer induced by the structural unit (I), or (2) reacting a monovalent epoxy compound to EVOH obtained by the saponification reaction. Here, a polymerization method of ethylene-vinyl alcohol copolymer or modified ethylene-vinyl alcohol copolymer may be any one of, but not particularly limited to, for example, solution polymerization, suspension polymerization, emulsion polymerization and bulk polymerization. Also, the method may be either a continuous mode or a batch-wise mode.

Vinylester that may be used for the polymerization may be fatty acid vinyl such as vinyl acetate, vinyl propionate, vinyl pivalate, and the like.

Further, in producing modified ethylene-vinyl alcohol copolymer, in addition to ethylene and vinylester, preferably a small amount of a monomer that may be copolymerized with monomers thereof may be used. The monomer that may be copolymerized with the monomers of ethylene and vinylester may be, in addition to monomers induced by the aforementioned structural unit (I), other alkenes; unsaturated carboxylic acid such as acrylic acid, methacrylic acid, crotonic acid, maleic acid and itaconic acid, or an anhydride thereof, or a salt thereof, monoalkylester, dialkylester and the like; nitriles such as acrylonitrile and methacrylonitrile; amides such as acrylamide, methacrylamide and the like; olefin sulfonic acid such as vinyl sulfonic acid, allylsulfonic acid, methallyl sulfonic acid and the like or a salt thereof; alkylvinylethers, vinyl ketones, N-vinylpyrrolidone, vinyl chloride, vinylidene chloride or the like. Further, vinylsilane compound may be used as a monomer, and an amount of vinylsilane compound introduced into the copolymer is preferably from 0.0002 mol % to 0.2 mol %. The vinylsilane compound may be, for example, vinyl trimethoxysilane, vinyl triethoxysilane, vinyl tri(β-methoxy-ethoxy) silane, γ-methacryloyloxypropyl methoxysilane, or the like. Among these vinylsilane compounds, vinyl trimethoxysilane and vinyl triethoxysilane are preferable.

Solvents that can be used for the polymerization is not particularly limited, as long as it is an organic solvent that may dissolve ethylene, vinyl ester and ethylene-vinyl ester copolymer. Specifically, alcohols such as methanol, ethanol, propanol, n-butanol and tert-butanol; dimethyl sulfoxide and the like may be mentioned. Among them, in terms of facilitating removal and separation after reaction, methanol is particularly preferred.

Initiators that may be used for the polymerization may be, for example, azonitorile based initiators such as 2,2'-azobisisobutyronitrile, 2,2'-azobis-(2,4-dimethyl valeronitrile), 2,2'-azobis-(4-methoxy-2,4-dimethyl valeronitrile), 2,2'-azobis-(2-cyclopropyl propionitrile) and the like; or organic peroxide initiators such as isobutyryl peroxide, cumyl peroxyneodecanoate, diisopropyl peroxycarbonate, di-n-propyl peroxydicarbonate, t-butyl peroxyneodecanoate, lauroyl peroxide, benzoyl peroxide, t-butyl hydroperoxide and the like.

Polymerization temperature is typically about 20-90° C., preferably 40-70° C. Polymerization time is typically about 2-15 hours, preferably 3-11 hours. A polymerization rate to the vinyl ester used as a basis is typically about 10-90%, preferably 30-80%. Resin content in the solution after the polymerization is about 5-85 mass %, preferably 20-70 mass %.

After polymerization for a predetermined time or after reaching a predetermined polymerization rate, polymerization inhibitor is added to the resulting copolymer solution as necessary, and unreacted ethylene gas is removed by evaporation, followed by removal of unreacted vinyl ester. An applicable method of removing the unreacted vinyl ester is, for example, a method to continuously supply the copolymer solution at a constant speed from a top of a column packed with Raschig ring and to blow organic solvent vapor such as methanol and the like from a bottom of the column, such that mixed vapor of the organic solvent such as methanol and the like and unreacted vinyl ester is distilled from the top of the column and copolymer solution from which the unreacted vinyl ester is removed is extracted from the button of the column.

Next, an alkali catalyst is added to the copolymer solution, such that the copolymer in the solution is saponified. A method of saponification may be of either continuous mode or batch-wise mode. The alkali catalyst may be, for example, sodium hydroxide, potassium hydroxide, alkali metal alcoholates or the like. Further, preferable conditions of the saponification are, for the batch-wise mode, for example, a concentration of the alkali catalyst in the copolymer solution is about 10-50 mass %, reaction temperature is about 30-65° C., an amount of catalyst to be used is about 0.02-1.0 moles per mole of vinyl ester structural unit, and the saponification time is about 1-6 hours.

Since the (modified) EVOH after saponification contains the alkali catalyst, byproduct salts such as sodium acetate and potassium acetate, and other impurities, these chemicals are preferably neutralized or removed by washing as needed. Here, when the (modified) EVOH after saponification is washed in the water such as ion-exchanged water that hardly contains metal ions, chloride ions and the like, some of sodium acetate, potassium acetate and the like may remain in the EVOH.

(Elastomer Layer)

The elastomer layer forming the multilayer structure of the present invention is a layer for imparting the crack resistance to the multilayer structure and may be, for example, a layer made of thermoplastic elastomer or a layer made of a polymer material in which the thermoplastic elastomer presents in a matrix manner. Note that the matrix means a continuous phase. The barrier layer described above has a high gas barrier property and is very effective in improving the internal pressure retention of the tire. However, since the barrier layer has a significantly high elastic modulus comparing to that of rubber in the tire, there is a risk to break or generate cracks due to deformation during bending. Therefore, by laminating the elastomer layer together with the barrier layer, high internal pressure retention and crack resistance of the multilayer structure may be ensured.

Also, the elongation at break (EB) of the elastomer layer is 100% or more. When the elongation at break (EB) is less than 100%, due to insufficient flexibility of the elastomer layer, a desired fatigue resistance may not be obtained. Here, the elongation at break (EB) represents the elongation at break when, under the conditions of 20° C. and 65% RH conforming to JIS K 7113, a sample with a thickness of 1 mm is measured at the tensile rate of 500 mm/min by using the dumbbell of JIS No. 3.

Preferably, an oxygen permeability amount of the elastomer layer at 20° C. and 65% RH is 10.0 cc·mm/m$^2$·day·atm or less. This is because, when the oxygen permeability amount exceeds 10.0 cc·mm/m$^2$·day·atm, sufficient inner pressure retention may not be obtained even when the barrier layer is provided. Note that the oxygen permeability amount is measured conforming to JIS K7126-1:2006.

The polymer material forming the elastomer layer may be, but not particularly limited to, for example, polystyrene-based thermoplastic elastomer, polyolefin-based thermoplastic elastomer, polydiene-based thermoplastic elastomer, polyvinyl chloride-based thermoplastic elastomer, chlorinated polyethylene-based thermoplastic elastomer, polyurethane-based thermoplastic elastomer, polyester-based thermoplastic elastomer, polyamide-based thermoplastic elastomer, fluorocarbon resin-based thermoplastic elastomer and the like. Among them, polyurethane-based thermoplastic elastomer is preferred. Note that those thermoplastic elastomers may be used alone, or in combination with of one or more other thermoplastic elastomers.

The polystyrene-based thermoplastic elastomer has an aromatic vinyl polymer block (hard segment) and a rubber block (soft segment), where an aromatic vinyl polymer portion forms a physical crosslinking and functions as a bridging point, while the rubber block imparts rubber elasticity. The polystyrene-based thermoplastic elastomer may be sorted by an array format of the soft segment in the molecule, and may be, for example, styrene-butadiene-styrene block copolymer (SBS), styrene-isoprene-styrene block copolymer (SIS), styrene-isobutylene-styrene block copolymer (SIBS), styrene-ethylene/butylene-styrene block copolymer (SEBS), styrene-ethylene/propylene-styrene block copolymer (SEPS) or the like. Further, a block copolymer of crystalline polyethylene, which is obtained by hydrogenating a block copolymer of polybutadiene and butadiene-styrene random copolymer, and ethylene/butylene-styrene random copolymer; and di-block copolymer of, for example, crystalline polyethylene, which is obtained by hydrogenating a block copolymer of polybutadiene or ethylene-butadiene random copolymer, and polystyrene, are also included. Among them, in terms of a balance of mechanical strength, heat stability, weather resistance, chemical resistance, the gas bather property, flexibility and workability, styrene-isobutylene-styrene block copolymer (SIBS), styrene-ethylene/butylene-styrene block copolymer (SEBS), and styrene-ethylene/propylene-styrene block copolymer (SEPS) are preferable.

The polyolefin-based thermoplastic elastomer includes thermoplastic elastomer containing a polyolefin block such as polypropylene, polyethylene and the like as the hard segment and a rubber block such as ethylene-propylene-diene copolymer and the like as the soft segment. Incidentally, such thermoplastic elastomer is classified into a blend type and an implant type. Further, as the polyolefin-based thermoplastic elastomer, maleic anhydride modified ethylene-butene-1 copolymer, maleic anhydride modified ethylene-propylene copolymer, halogenated butyl rubber, modified polypropylene, modified polyethylene, and the like may be mentioned.

As the polydiene-based thermoplastic elastomer, 1,2-polybutadiene-based TPE, trans-1,4-polyisoprene-based TPE, hydrogenated and conjugated diene-based TPE, epoxidized natural rubber and the like may be mentioned. 1,2-Polybutadiene-based TPE is polybutadiene having more than 90% of 1,2-binding in the molecule, and composed of crystalline syndiotactic 1,2-polybutadiene as the hard segment and amorphous 1,2-polybutadiene as the soft segment. Also, trans-1,4-polyisoprene-based TPE is polyisoprene having more than 98% of a structure of trans-1,4 in the molecule, and composed of crystalline trans 1,4 segments as the hard segment and amorphous trans 1,4 segments as the soft segment.

In general, polyvinyl chloride-based thermoplastic elastomer (TPVC) is roughly categorized into the following three types.

Type 1: High Molecular Weight Polyvinyl Chloride (PVC)/Plasticized Polyvinyl Chloride (PVC) Blended TPVC This is thermoplastic elastomer formed by using a high molecular weight PVC for the hard segment and PVC plasticized with a plasticizer for the soft segment. Since the high molecular weight PVC is used for the hard segment, a micro-crystalline portion has a function as the crosslinking point.

Type 2: Partially Crosslinked PVC/Plasticized PVC Blended TPVC

This is thermoplastic elastomer formed by using PVC having partial crosslinking or branched structure introduced thereto for the hard segment and PCV plasticized by the plasticizer for the soft segment.

Type 3: PVC/Elastomer-Alloy Type TPVC

This is thermoplastic elastomer containing PVC as the hard segment and rubber such as partially crosslinked nitrile butadiene rubber (NBR) or TPE such as polyurethane-based TPE, polyester-based TPE and the like as the soft segment.

The chlorinated polyethylene-based thermoplastic elastomer is a soft resin which is obtained by reacting polyethylene with chlorine gas in a solvent such as aqueous suspension or carbon tetrachloride, and crystalline polyethylene block is used for the hard segment and chlorinated polyethylene (CPE) block is used for the soft segment. Note that, in the CPE block, both components of polyethylene and chlorinated polyethylene are mixed as a multi-block mixture of a random structure mixture.

The polyester-based thermoplastic elastomer (TPEE) is a multi-block copolymer having polyester as the hard segment in the molecule and polyether or polyester with low glass transition temperature (Tg) as the soft segment. TPEE may be categorized into the types described below based on a molecular structure, and mainly categorized into polyester-polyether type TPEE and polyester-polyester type TPEE.

(1) Polyester-Polyether Type TPEE

In general, this is thermoplastic elastomer having aromatic crystalline polyester as the hard segment and polyether as the soft segment.

(2) Polyester-Polyester Type TPEE

This is thermoplastic elastomer having aromatic crystalline polyester as the hard segment and aliphatic polyester as the soft segment.

(3) Liquid Crystal TPEE

This is thermoplastic elastomer having rigid liquid crystal molecules as the hard segment and aliphatic polyester as the soft segment.

The polyamide-based thermoplastic elastomer (TPA) is a multi-block copolymer having polyamide as the hard segment and polyether or polyester with a low Tg as the soft segment. Polyamide component composing the hard segment is selected from nylon 6, 66, 610, 11, 12 and the like, and mainly from nylon 6 and nylon 12. As a structure material of the soft segment, long-chain polyol such as polyether diols, polyester diols and the like may be used. Typical examples of polyether polyols may be diol poly(oxy tetramethylene)glycol (PTMG), poly(oxypropylene)glycol and the like. Typical examples of polyester polyols may be poly(ethylene adipate)glycol, poly(butylene-1,4 adipate)glycol and the like.

The fluorine resin-based thermoplastic elastomer is an ABA block copolymer having fluorine resin as the hard segment and fluorine rubber as the soft segment. The fluorine resin composing the hard segment may be tetrafluoroethylene-ethylene copolymer or polyvinylidene fluoride (PVDF) or the like. The fluorine rubber composing the soft segment may be vinylidene fluoride-hexafluoropropylene-tetrafluoroethylene terpolymers or the like. More specifically, vinylidene fluoride rubber, tetrafluoroethylene-propylene rubber, tetrafluoroethylene-perfluoro methyl vinyl ether rubber, phosphazene type fluorine rubber, fluoro polyether, fluoronitroso rubber, perfluoro triazine and the like may be contained. In fluorine resin-based TPE, microphase separation is occurred in a manner similar to other TPE and the hard segment forms the crosslinking point.

The polyurethane-based thermoplastic elastomer (TPU) is a straight-chain multi-block copolymer composed of (1) polyurethane obtained by reaction between short chain glycol and isocyanate as the hard segment and (2) polyurethane obtained by reaction between long chain glycol and isocyanate as the soft segment. Here, polyurethane is a general term of compounds having a urethane linkage (—NHCOO—) obtained by a polyaddition reaction (urethane reaction) of isocyanate (—NCO) and alcohol (—OH). According to the multilayer structure of the present invention, when the polymer material forming the elastomer layer is TPU, the stretchability and the thermoformability may be improved by laminating the elastomer layer. Further, since such an inner liner may have improved interlayer adhesion between the elastomer layer and the barrier layer, high durability such as high crack resistance and the like may be obtained and, when the inner liner is deformed in use, the gas barrier property and the stretchability may be maintained.

The TPU is composed of polymeric polyol, organic polyisocyanate, a chain extender, and the like. The polymeric polyol is a substance having multiple hydroxy groups and may be obtained by polycondensation, addition polymerization (for example, ring-opening polymerization), polyaddition and the like. The polymeric polyol may be, for example, polyester polyol, polyether polyol, polycarbonate polyol or cocondensates thereof (for example, polyester-ether-polyol), or the like. Among them, polyester polyol and polycarbonate polyol are preferable, and polyester polyol is particularly preferable. Note that those polymer polyols may be used alone, or in combination with one or more other polymer polyols.

Here, the polyester polyol may be prepared by, for example, in accordance with a conventional method, condensation of compound that may form dicarboxylic acids, esters thereof, or anhydrides thereof and a low molecular weight polyol by direct esterification or transesterification, or by ring-opening polymerization of lactones.

Dicarboxylic acid that may be used to generate polyester polyol may be, but not particularly limited to, dicarboxylic acid which is commonly used in the production of polyester. Specifically, the dicarboxylic acid may be aliphatic dicarboxylic acid having 4 to 12 carbon atoms such as succinic acid, glutaric acid, adipic acid, pimelic acid, suberic acid, azelaic acid, sebacic acid, dodecanedioic acid, methyl succinic acid, 2-methyl glutaric acid, trimethyl adipic acid, 2-methyloctanic diacid, 3,8-dimethyldecanic diacid, 3,7-dimethyldecanic diacid, and the like; cycloaliphatic dicarboxylic acid such as cyclohexanedicarboxylic acid and the like; aromatic dicarboxylic acid such as terephthalic acid, isophthalic acid, orthophthalic acid, naphthalene dicarboxylic acid, and the like. These dicarboxylic acids may be used alone, or in combination with one or more other dicarboxylic acids. Among them, aliphatic dicarboxylic acid having 6 to 12 carbon atoms is preferable, and adipic acid, azelaic acid and sebacic acid are particularly preferable. These dicarboxylic acids have a carbonyl group that more easily reacts with the hydroxy group and thus is capable of significantly improving the interlayer adhesion to the barrier layer.

The low molecular weight polyol that may be used to generate polyester polyol may be, but not particularly limited to, low molecular weight polyol that is commonly used in the production of polyester. Specifically, the low molecular weight polyol may be aliphatic diol having 2 to 15 carbon atoms such as ethylene glycol, diethylene glycol, triethylene glycol, propylene glycol, 1,3-propanediol, 2-methyl-1,3-propanediol, 1,3-butylene glycol, 1,4-butanediol, neopentyl glycol, 1,5-pentanediol, 3-methyl-1,5-pentanediol, 1,6-hexanediol, 1,8-octanediol, 2-methyl-1,8-octane diol, 2,7-dimethyl-1,8-octanediol, 1,9-nonanediol, 2-methyl-1,9-nonanediol, 1,10-decanediol, 2,2-diethyl-1,3-propanediol, and the like; or alicyclic diol such as 1,4-cyclohexanediol, cyclohexanedimethanol, cyclooctanedimethanol, dimethyl cyclooctanedimethanol, and the like; aromatic dihydric alcohol such as 1,4-bis(β-hydroxyethoxy)benzene and the like. These low molecular weight polyols may be used alone, or in combination with one or more other low molecular weight polyols. Among them, aliphatic diol having 5 to 12 carbon atoms having a methyl group in a side chain of 3-methyl-1,5-pentanediol, 2-methyl-1,8-octanediol, 2,7-dimethyl-1,8-octanediol, 1,9-nonanediol, 2,8-dimethyl-1,9-nonanediol, and the like are preferable. Polyester polyol obtained by using such aliphatic diol may easily react with a hydroxyl group and thus is capable of significantly improving the interlayer adhesion to the barrier layer. Further, together with the low molecular weight polyol, a small amount of low molecular weight polyol having three or more functional groups may be used. The low molecular weight polyol having three or more functional groups may be, for example, trimethylol propane, trimethylol ethane, glycerin, 1,2,6-hexane triol, and the like.

Lactones that may be used to generate the polyester polyol may be, for example, ε-caprolactone, β-methyl-δ-valerolactone and the like.

The polyether polyols may be, for example, polyethylene glycol, polypropylene glycol, polytetramethylene glycol, poly(methyltetramethylene)glycol and the like. The polyether polyols may be used alone, or in combination with one or more other polyether polyols. Among them, polytetramethylene glycol is preferable.

The polycarbonate polyols may be, preferably, compound obtained from condensation polymerization of aliphatic diol having 2-12 carbon atoms such as, for example, 1,4-butanediol, 1,5-pentanediol, 1,6-hexanediol, 1,8-octanediol, 1,10-decanediol and the like or mixture thereof, by an action of diphenyl carbonate, phosgene and the like.

For the polymeric polyol, a lower limit of the number average molecular weight is preferably 500, more preferably 600, particularly preferably 700. On the other hand, an upper limit of the number average molecular weight of the polymeric polyol is preferably 8,000, more preferably 5,000, particularly preferably 3,000. When the number average molecular weight of the polymer polyol is less than the lower limit, compatibility with the organic polyisocyanate is so high that the elasticity of the resulting TPU becomes insufficient. Therefore, dynamic property such as the stretchability, and the thermoformability of the resulting inner liner may be deteriorated. On the other hand, when the number average molecular weight of the polymeric polyol exceeds the upper limit, the compatibility with the organic polyisocyanate is so low that mixing in the polymerization process becomes difficult. As a result, a stable TPU may not be obtained due to generation of mass in a gel state and the like. Note that the number average molecular weight of the polymer polyol is measured conforming to JIS-K-1577 and calculated on the basis of a hydroxy group value.

The organic polyisocyanate may be, but not particularly limited to, a known organic diisocyanate that is commonly used in the manufacture of TPU. As the organic diisocyanate, for example, aromatic diisocyanate such as 4,4'-diphenylmethane diisocyanate, tolylene diisocyanate, phenylene diisocyanate, xylylene diisocyanate, 1,5-naphthylene diisocyanate, 3,3'-dichloro-4,4'-diphenylmethane diisocyanate, toluoylene diisocyanate and the like; and aliphatic diisocyanate or alicyclic diisocyanate such as hexamethylene diisocyanate, isophorone diisocyanate, 4,4'-dicyclohexylmethane diisocyanate, hydrogenated xylylene diisocyanate and the like may be mentioned. Among them, in terms of capability to improve strength and the crack resistance of the resulting inner liner, 4,4'-diphenylmethane diisocyanate is preferable.

These organic polyisocyanates may be used alone, or in combination with one or more other organic polyisocyanates.

The chain extender may be, but not particularly limited to, a known chain extender commonly used in the manufacture of TPU, and low molecular weight compounds having 300 or less molecules having two or more active hydrogen atoms capable of reacting with an isocyanate group in the molecule are preferably used. As the chain extender, for example, ethylene glycol, propylene glycol, 1,4-butanediol, 1,6-hexanediol, 1,4-bis(β-hydroxyethoxy)benzene, 1,4-cyclohexanediol, and the like may be mentioned. Among them, in terms of further improving the stretchability and the thermoformability of the resulting inner liner, 1,4-butanediol is particularly preferred. These chain extenders may be used alone, or in combination with one or more other chain extenders.

The method of producing the TPU may be a manufacturing method using the polymer polyol, the organic polyisocyanate and the chain extender and utilizing a known urethane-forming reaction technique, and either one of prepolymer method and a one-shot method may be used. In particular, carrying out melt polymerization substantially in the absence of solvent is preferable, and carrying out continuous melt polymerization using a multi-screw extruder is more preferable.

For the TPU, a ratio of mass of the organic polyisocyanate to total mass of polymer polyol and the chain extender [isocyanate/(polymeric polyol+chain extender)] is preferably 1.02 or less. When the ratio is more than 1.02, there is a risk to deteriorate long-term operation stability at the time of molding.

(Method for Producing Multilayer Structure)

A method for producing the multilayer structure according to the present invention is not particularly limited, as long as it may satisfactorily laminate and adhere the barrier layer and the elastomer layer described above, and may be a known method such as, for example, coextrusion, hand setting, coating, bonding, adherence or the like. Among them, as a method for producing the multilayer structure according to the present invention, a method to prepare a plurality of resin compositions and producing the multilayer structure having the barrier layer by a multi-layer co-extrusion method using those compositions is preferable. This is because the method has high productivity and the resulting multilayer structure has excellent interlayer adhesion.

In the multilayer co-extrusion method, the resin or the resin composition forming the barrier layer is heated and melted, and then supplied to an extrusion die through each path from different extruders or pumps, extruded to the multilayer from the extrusion die, and adhered in a laminating manner. Thereby, the multilayer structure according to the present invention is formed. As the extrusion die, for example, a multi-manifold die, a field block, a static mixer or the like may be used.

According to the multilayer structure of the present invention, also, on one side or on both sides thereof, a support layer for supporting a laminated product may be laminated. The support layer may be, but not particularly limited to, for example, a synthetic resin layer commonly used as a support layer. A laminating method of the support layer on the barrier layer and the elastomer layer may be, but not particularly limited to, for example, an adhesion method using an adhesive, an extrusion lamination method or the like.

<Inner Liner for Pneumatic Tire>

Next, with reference to the drawings, the inner liner of the present invention for a pneumatic tire and the pneumatic tire according to the present invention will be described in detail. The inner liner of the present invention for the pneumatic tire is characterized in comprising the multilayer structure described above.

<Pneumatic Tire>

The pneumatic tire according to the present invention is characterized in comprising the inner liner. The pneumatic tire according to the present invention may be manufactured by applying the multilayer structure described above as an inner liner 12 and using a conventional method.

In the pneumatic tire of the present invention, rubber composing the tire and the inner liner 12 may be adhered to each other by using adhesive.

Figure 2:
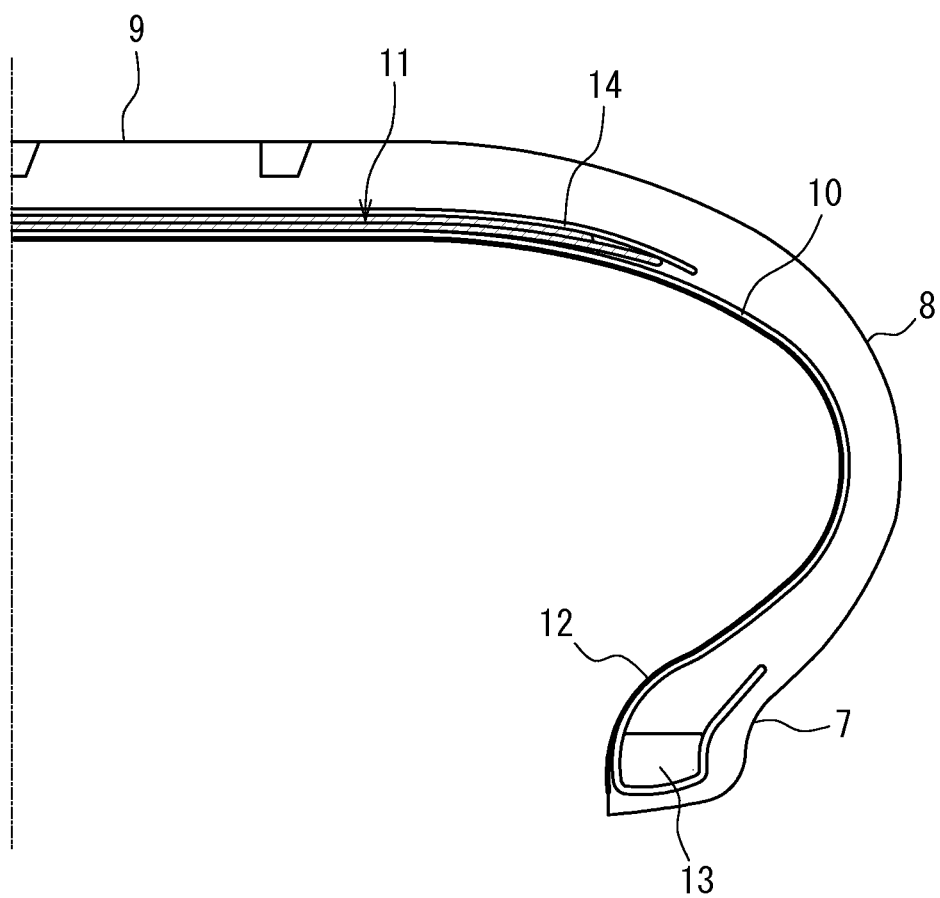
FIG. 2 is a partial cross-sectional view of an example of a pneumatic tire according to the present invention.

FIG. 2 is a partial cross-sectional view of an example of the pneumatic tire according to the present invention. The tire illustrated in FIG. 2 includes a pair of bead portions 7, a pair of sidewall portions 8, a tread portion 9 communicating with both of the sidewall portions 8, a carcass 10 troidally extending between the pair of bead portions 7 for reinforcing each of the portions 7, 8 and 9, and a belt 11 made up of two belt layers arranged outside a crown portion of the carcass 10 in a tire radial direction. Further, the inner liner 12 is disposed on a tire inner surface inside the carcass 10.

In the tire illustrated in the figure by way of example, the carcass 10 includes a main body portion troidally extending between a pair of bead cores 13, each of which is embedded in the bead portion 7, and a folding portion folded up radially outwardly from an inner side in a tire width direction around each of the bead cores 13. In the tire according to the present invention, however, the number of plies and a structure of the carcass 10 are not limited thereto.

Further, although the belt 11 in the tire illustrated in the figure by way of example is made up of two belt layers, the number of belt layers for forming the belt 11 in the tire according to the present invention is not limited thereto. Here, the belt layer is usually formed by using a rubberized layer of a code extending obliquely with respect to a tire equatorial plane and, in the two belt layers, codes constituting the belt layers are laminated to intersect with each other across the equatorial plane, thereby forming the belt 11. Further, although the tire illustrated in the figure by way of example includes a belt reinforcing layer 14 disposed so as to cover the entire belt 11 outside of the belt 11 in the tire radial direction, the tire of the present invention does not need to have the belt reinforcing layer 14, or may have a belt reinforcing layer with another structure. Here, usually, the belt reinforcing layer 14 is formed by the rubberized layer of codes arranged in substantially parallel with respect to a tire circumferential direction.

Examples

The following describes the present invention in more detail by using Examples. However, the present invention is not limited to the following Examples in any manners.

(Samples 1-12 of Examples and Comparative Examples)

Multilayer structures comprising barrier layers and elastomer layers with conditions shown in Table 1 were produced.

A thickness of each layer is obtained by observing a cross-section by using DIGITAL MICROSCOPE VHX-900 (manufactured by KEYENCE CORPORATION) or an electron microscope VE-8800 (manufactured by KEYENCE CORPORATION), such that an average thickness of each of the layers and a thickness of the multilayer structure were obtained. Results are shown in Table 1.

Subsequently, for each sample multilayer structure, by using [Cure Tron EB200-100 manufactured by NHV Corporation], electron beams in an irradiation dose shown in Table 1 were irradiated at an acceleration voltage of 200 kV. Thereby, a crosslinked multilayer film (multilayer structure) was obtained.

For each sample multilayer film produced as described above, the tolerance point was determined from an SS curve of a tension and recovery obtained by conducting a tension test (chuck speed 500 mm/min) conforming to JIS K 7113 and an operation, when an input strain of the sample reached 100%, to undo until the input strain of the sample becomes 0% at the chuck speed 500 mm/min (to move the chuck in a direction opposite to the tensile test). As illustrated in FIGS. 3(a)-(d), (A) a deformation amount at the tolerance point, (B) an input deformation amount at the time of 100% deformation input and (C) a plastic deformation amount at the time of 100% deformation input were also obtained. Results of measurement are shown in Table 1.

Then, the gas barrier property, the inner pressure retention and the fatigue resistance of each sample multilayer film produced in the above manner were evaluated in the following manners. Results are shown in Table 1.

(1) Gas Barrier Property

The film described above was conditioned at 20° C. and 65% RH for 5 days. For two resulting conditioned films, by using MOCON OX-TRAN2/20 type manufactured by Modern Control Co. Ltd., conforming to JIS K7126 (equal pressure method) under the conditions of 20° C. and 65% RH, the oxygen permeability amount was measured and an average thereof was obtained. For the gas barrier property, evaluation was carried out using an index with respect to an oxygen permeability amount of a sample 1 as 100. The smaller the value is, the smaller the oxygen permeability amount is and thus the better the result is.

(2) Inner Pressure Retention

A tire described above was, in the atmosphere of −30° C. at the air pressure of 140 kPa, pressed with a compression force of 6 kN on a rotary drum corresponding to a speed at 80 km/h and run for 10,000 km. Then, after mounting the tire (test tire) which has been running as described above on a rim of 6JJ×15, the tire was left standing with the internal pressure at 240 kPa, for 3 months. Three month later, the internal pressure was measured and, by using the following formula:

Internal pressure retention=((240−$b$)/(240−$a$))×100

[in this formula, a represents the internal pressure (kPa) of the test tire of 3 months later, b represents an internal pressure (kPa) of a test tire of Comparative Example 1 of 3 month later], the internal pressure retention was evaluated. With a value of a sample 2 as 100, other values were represented by indexes. The larger the index is, the better the internal pressure retention is.

(3) Fatigue Resistance (the Number of Cracks after Low-Temperature Drum Running Test)

To the above film, an auxiliary layer, which is a rubber composition layer with a thickness of 500 μm, was adhered and EB was irradiated. Then, adhesive (Ogasawara ENR adhesive) was applied to the film, which was then adhered to an inner surface as the auxiliary layer. Thereby, the inner liner was produced. By using thus produced inner liner, as illustrated in FIG. 3, a pneumatic tire for a passenger car in size: 195/65R15 was produced by a conventional method.

Thus produced pneumatic tire, at room temperature (20° C.) under the air pressure at 140 kPa, was pressed with a load of 6 kN on a rotary drum running at a speed corresponding to 80 km/h and run for 20,000 km. The number of cracks on a film surface of a tire shoulder portion 10 cm×10 cm after running was measured to evaluate the fatigue resistance.

TABLE 1

Figure 3:
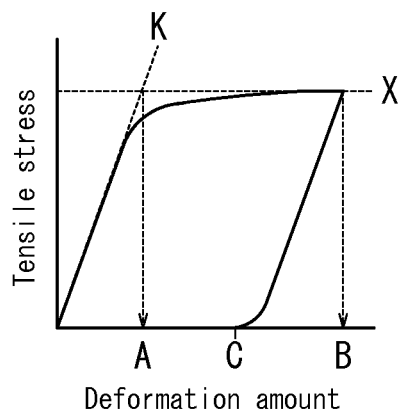
FIGS. 3(a)-(d) are diagrams respectively illustrating a relationship between a force per a unit sectional area and a deformation amount of a multilayer structure according to the present invention.
Figure 3:
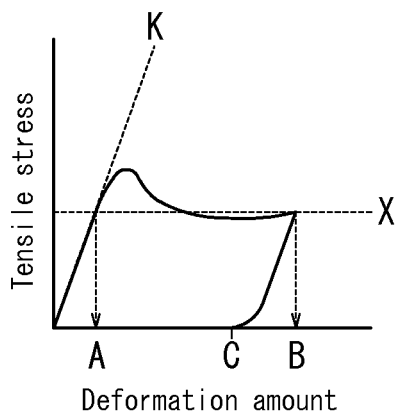
Figure 3:
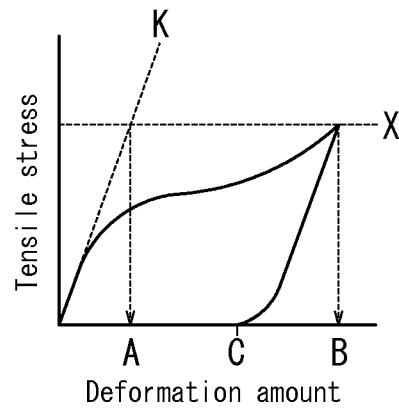
Figure 3:
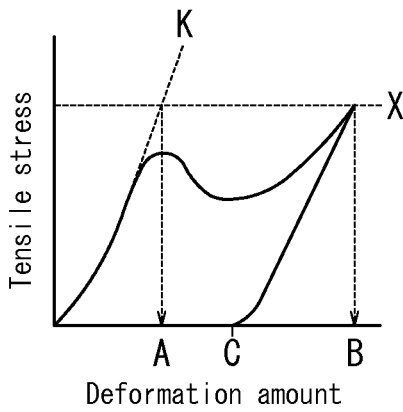

| | | Sample | | | | | | | | | | | |
|---|---|---|---|---|---|---|---|---|---|---|---|---|---|
| | | 1 Comparative Example | 2 Comparative Example | 3 Example | 4 Example | 5 Comparative Example | 6 Comparative Example | 7 Example | 8 Example | 9 Comparative Example | 10 Comparative Example | 11 Example | 12 Example |
| Barrier Layer | Type | Resin 1[*1] | Resin 1[*1] | Resin 1[*1] | Resin 1[*1] | Resin 1[*1] | Resin 1[*1] | Resin 1[*1] | Resin 1[*1] | Resin 1[*1] | Resin 1[*1] | Resin 1[*1] | Resin 1[*1] |
| | Average Layer Thickness (mm) | 2 | 2 | 2 | 2 | 2 | 2 | 2 | 2 | 2 | 2 | 2 | 2 |
| | Elongation at Break (%) | 15 | 15 | 15 | 15 | 15 | 15 | 15 | 15 | 15 | 15 | 15 | 15 |
| | Number of Layers | 4 | 4 | 4 | 4 | 4 | 4 | 4 | 4 | 4 | 4 | 4 | 4 |
| | Oxygen Permeability Modulus (cm³·20 μm/m²·24 hrs·atm) | 0.4 | 0.4 | 0.4 | 0.4 | 0.4 | 0.4 | 0.4 | 0.4 | 0.4 | 0.4 | 0.4 | 0.4 |
| Elastomer Layer | Type | Resin 2[*2] | Resin 2[*2] | Resin 2[*2] | Resin 2[*2] | Resin 3[*3] | Resin 3[*3] | Resin 3[*3] | Resin 3[*3] | Resin 4[*4] | Resin 4[*4] | Resin 4[*4] | Resin 4[*4] |
| | Elongation at Break (%) | 500 | 500 | 500 | 500 | 640 | 640 | 640 | 640 | 890 | 890 | 890 | 890 |
| | Average Layer Thickness | 2 | 7 | 15 | 27 | 2 | 7 | 15 | 27 | 2 | 7 | 15 | 27 |
| | Number of Layers | 4 | 4 | 4 | 4 | 4 | 4 | 4 | 4 | 4 | 4 | 4 | 4 |
| Total Number of Layers | | 8 | 8 | 8 | 8 | 8 | 8 | 8 | 8 | 8 | 8 | 8 | 8 |
| Thickness of Multilayer Structure | | 16 | 56 | 116 | 216 | 16 | 56 | 116 | 216 | 16 | 56 | 116 | 216 |
| Stress-Curved Line Shape Pattern (See Figure) | | FIG. 3(c) | FIG. 3(c) | FIG. 3(c) | FIG. 3(c) | FIG. 3 (a) | FIG. 3 (a) | FIG. 3 (a) | FIG. 3 (a) | FIG. 3 (b) | FIG. 3 (b) | FIG. 3 (b) | FIG. 3 (b) |
| Deformation Amount at Pseudo Tolerance Point (A) (%) | | 21 | 21 | 21 | 21 | 15 | 15 | 15 | 15 | 13 | 13 | 13 | 13 |
| Input Deformation Amount at 100% Deformation Input (B) (%) | | 100 | 100 | 100 | 100 | 100 | 100 | 100 | 100 | 100 | 100 | 100 | 100 |
| Plastic Deformation Amount at 100% Deformation Input (C) (%) | | 82 | 80 | 69 | 60 | 88 | 85 | 76 | 62 | 93 | 88 | 79 | 69 |
| Difference between Input Deformation Amount and Plastic Deformation Amount at 100% Deformation Input | | 18 | 20 | 31 | 40 | 12 | 15 | 24 | 38 | 7 | 12 | 21 | 31 |
| Gas Barrier Property (Index) | | 100 | 100 | 100 | 100 | 100 | 100 | 100 | 100 | 100 | 100 | 100 | 100 |
| Internal Pressure Retention | | 100 | 100 | 100 | 100 | 100 | 100 | 100 | 100 | 100 | 100 | 100 | 100 |
| Fatigue Resistance (Cracks) (Number) | | 32 | 32 | 28 | 12 | 24 | 24 | 21 | 15 | 8 | 8 | 6 | 1 |

[*1] produced by Kuraray Co., Ltd., EVAL F101B
[*2] produced by Kuraray Co., Ltd., Kuramiron U9195
[*3] produced by Kuraray Co., Ltd., Kuramiron U9180
[*4] produced by Kuraray Co., Ltd., Kuramiron U9165

As can be seen from the results shown in Table 1, the multilayer structure (multilayer film) of the Examples, similarly to those of Comparative Examples, may achieve both high gas barrier property and high internal pressure retention. It can also be seen that the multilayer structure of Examples, comparing to those of Comparative Examples using the same materials of the barrier layer and the elastomer layer, shows higher fatigue resistance as a result.

INDUSTRIAL APPLICABILITY

According to the present invention, the multilayer structure having high gas bather property as well as excellent fatigue resistance may be provided. Also, an inner liner for a pneumatic tire using such a multilayer structure and a pneumatic tire comprising the inner liner may be provided. Accordingly, since a pneumatic tire comprising higher gas barrier property than that of conventional tires and durable for a prolonged use may be obtained, the present invention is industrially useful.

REFERENCE SIGNS LIST 1 multilayer structure
2 barrier layer
3 elastomer layer
4 synthetic resin layer
5 rubber
7 bead portion
8 sidewall portion
9 tread portion
10 carcass
11 belt
12 inner liner
13 bead core
14 belt reinforcing layer

The invention claimed is:

1. A multilayer structure comprising barrier layers consisting of ethylene-vinyl alcohol copolymer and/or modified ethylene-vinyl alcohol copolymer with 50% or less elongation at break conforming to JIS K 7113 at 20° C. and 65% RH and elastomer layers made of polyurethane-based thermoplastic elastomer with 640% or more elongation at break conforming to JIS K 7113 at 20° C. and 65% RH, wherein
a difference between an input deformation amount of the multilayer structure at the time of 100% deformation input and a plastic deformation amount of the multilayer structure at the time of 100% deformation input is larger than a deformation amount at a tolerance point,
wherein an oxygen permeability coefficient of the barrier layers at 20° C. and 65% RH is 10.0 cc·mm/m$^2$·day·atm or less,
wherein the barrier layers and the elastomer layers are laminated to form the multilayer structure having 7-3000 layers, and
wherein each of thickness of the barrier layers and the elastomer layers is within a range of 0.001-40 µm.

2. The multilayer structure according to claim 1, wherein a thickness of the barrier layers is 10 µm or less.

3. The multilayer structure according to claim 1 wherein the barrier layers and the elastomer layers are crosslinked by irradiation of active energy rays.

4. An inner liner for a pneumatic tire using the multilayer structure according to claim 1.

5. A pneumatic tire comprising the inner liner for a pneumatic tire according to claim 4.

* * * * *